L. H. HORTON.
FERTILIZER DISTRIBUTER.
APPLICATION FILED MAR. 25, 1911.
1,000,003.
Patented Aug. 8, 1911.
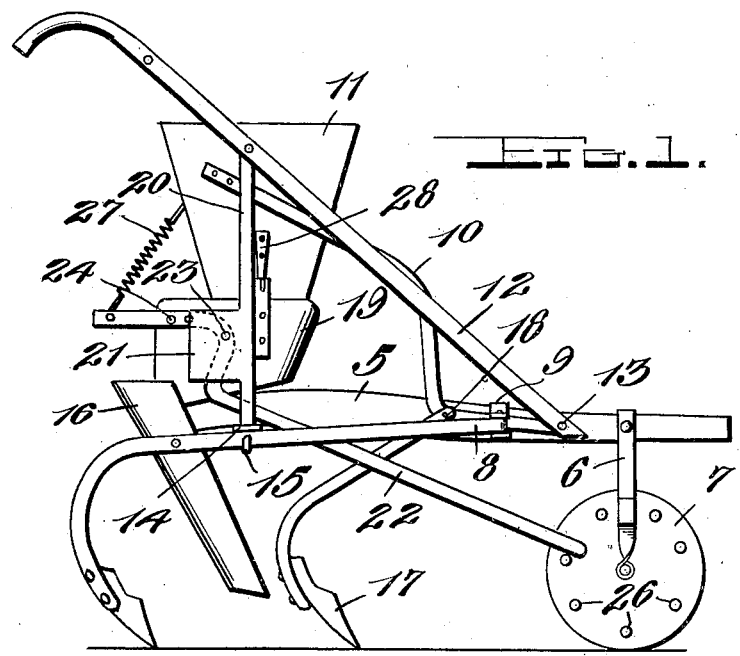
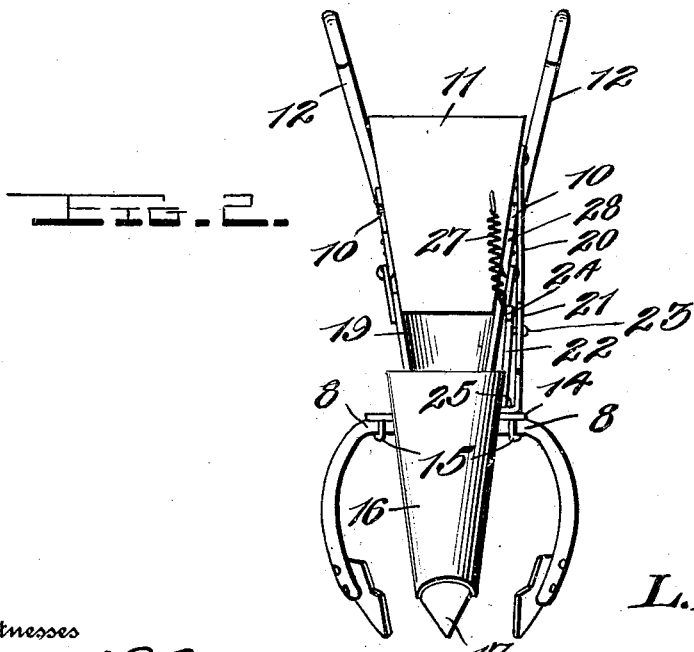

UNITED STATES PATENT OFFICE.

LEMUEL HOLOWAY HORTON, OF GUNTOWN, MISSISSIPPI.

FERTILIZER-DISTRIBUTER.

1,000,003.  Specification of Letters Patent.  Patented Aug. 8, 1911.

Application filed March 25, 1911. Serial No. 616,909.

*To all whom it may concern:*

Be it known that I, LEMUEL H. HORTON, a citizen of the United States, residing at Guntown, in the county of Lee and State of Mississippi, have invented certain new and useful Improvements in Fertilizer-Distributers, of which the following is a specification, reference being had to the accompanying drawings.

This invention relates to fertilizer distributers and has for its primary object to provide means whereby the positive and constant feed of the material to the conducting chute is assured.

A further object of the invention resides in the provision of a machine of the above character consisting of a wheel supported beam and a hopper mounted thereon, a vibrating feed chute pivotally mounted beneath the hopper and a conducting chute fixed to the beam to receive the material from said vibratory chute, and a pivotally mounted agitating element connected to said chute, said element being adapted to be engaged by means carried by the wheel to agitate the feed chute.

With the above and other objects in view, the invention consists of the novel features of construction, combination and arrangement of parts hereinafter fully described and claimed, and illustrated in the accompanying drawings, in which—

Figure 1 is a side elevation of a machine embodying my improvements; and Fig. 2 is a rear end elevation thereof.

Referring in detail to the drawing 5 designates a beam to the forward end of which a wheel supporting yoke 6 is secured. In the lower ends of this yoke the ground wheel 7 is rotatably mounted. Bars 8 have their forward ends secured between the ends of the transverse bars 9 which are secured to the upper and lower edges of the beam 5 and coverers are secured thereto at the rear end.

Parallel bars 10 are mounted upon the beam 5 and extend above the same, the upper ends of said bars being rearwardly inclined and, having mounted between them the hopper 11 in which the fertilizer material is placed. The diverging handle bars 12 extend upon opposite sides of the beam 5 and are secured thereto by means of a bolt 13, said bolt also passing through the ends of the hopper supporting bars 10. A transverse plate 14 also connects the bars 8 adjacent to their rear ends and is fixed upon the beam 5, said plate carrying suitable clips 15 to receive the bars.

To the rear end of the beam 5 a conducting chute 16 is secured, the lower end of said chute being disposed directly behind the point of the plow or furrow opener 17, the beam of which straddles the beam 5 and is secured to the bars 10 as indicated at 18. A spout or vibrating chute 19 is arranged below the hopper 11 and has its rear open end disposed in the upper end of the conducting chute 16. A vertical bar 20 is secured at its upper end to one of the handle bars 12 and has a laterally extending plate 21 formed integral therewith. Upon this plate a bar 22 is pivotally mounted as indicated at 23. The rear end of said bar is offset and secured to the chute 19 by means of a rivet or other suitable fastening device 24. The lower end of the vertical bar 20 is transversely disposed as indicated at 25 and extends beneath the lower edge of the downwardly and forwardly inclined portion of the bar 22 to retain the forward extremity of said bar in position for engagement with a plurality of pins 26 extending from one face of the ground wheel 7. One end of a coiled spring 27 is secured to the rear end of the bar 22 and the other end thereof to the hopper 11.

The chute 19 is supported in the lower ends of the arms 28 secured to the opposite sides of the hopper 11 and is adapted to be rocked or oscillated upon said arms in the movement of the machine across the field.

The machine is adapted to operate in the following manner. As the ground wheel 7 revolves in the movement of the machine, the pins 26 successively engage the forward end of the bar 22 and move said bar upon its pivot 23 against the tension of the spring 27. This spring returns the bar to its normal position after the pin 26 moves past the same, the lower end 25 of the bar 20 forming a stop for the bar 22. It will be obvious that when the bar 22 is thus oscillated, the chute 19 to which said bar is connected will also be rocked or oscillated to cause the material to move out of said chute 19 and into the conducting chute 16. This fertilizing material often becomes damp and lumpy so that it will not feed freely from the hopper into the chute 16. By thus automatically agitating the chute 19, this difficulty is overcome and a constant flow of the fertilizer material into the chute 16 is assured under all conditions. It is of course understood that as the machine is moved, the furrow opener 17 first forms the furrow into which the material is deposited and the coverers which are arranged behind the furrow opener then cover the material with earth which has been thrown from the furrow.

From the foregoing it is believed that the construction and operation of my device will be readily understood without necessitating any further description. It is comparatively simple and extremely durable and efficient in practical use.

While I have shown and described the preferred construction and arrangement of the various parts, it will be understood that the device is susceptible of a great many minor modifications without departing from the essential feature or sacrificing any of the advantages of the invention.

Having thus described the invention, what is claimed is:—

The herein described fertilizer distributer comprising, in combination with a wheel supported beam and a hopper mounted thereon, a conducting chute secured to the rear end of the beam, a feed spout pivotally mounted upon opposite sides of the hopper at its lower end, said spout extending rearwardly of the hopper and having its rear end disposed within the upper end of the conducting chute, rearwardly extending bars connected to the beam and having coverers on their rear ends located in the rear of said conducting chute, upwardly extending handles secured to the beam, a transverse bar connecting said rearwardly extending bars, a vertical bar fixed to said transverse bar at its lower end and to one of the handle bars at its upper end, said vertical bar having a rearwardly and laterally extending plate integrally formed therewith, a forwardly and downwardly inclined bar having a rearwardly and longitudinally extending offset end rigidly fixed to said feed spout, said offset end portion of the bar being pivotally secured upon the lateral plate of said vertical bar, a plurality of pins secured to the beam supporting wheel to engage the forward lower end of the inclined bar to oscillate the same upon its pivot, and a coiled spring secured to the extremity of the offset end of the bar and to the hopper to yieldingly hold said bar against pivotal movement.

In testimony whereof I hereunto affix my signature in the presence of two witnesses.

LEM. HOLOWAY HORTON.

Witnesses:
J. H. WARD,
C. M. RODGERS.